(12) United States Patent
Fisher et al.

(10) Patent No.: US 9,845,045 B2
(45) Date of Patent: Dec. 19, 2017

(54) VEHICLE WHEEL-BASED POWER GENERATION AND DISPLAY SYSTEMS

(71) Applicant: Foundation Productions, LLC, San Francisco, CA (US)

(72) Inventors: Ronald Fisher, San Francisco, CA (US); Bryan Davis, San Francisco, CA (US); John Peery, Palo Alto, CA (US); Michael Prados, San Francisco, CA (US); Roni Robinzon, Migdal HaEmel (IL)

(73) Assignee: FOUNDATION PRODUCTIONS, LLC, San Francisco, CA (US)

( * ) Notice: Subject to any disclaimer, the term of this patent is extended or adjusted under 35 U.S.C. 154(b) by 0 days.

(21) Appl. No.: 15/345,493

(22) Filed: Nov. 7, 2016

(65) Prior Publication Data

US 2017/0072842 A1 Mar. 16, 2017

Related U.S. Application Data

(63) Continuation of application No. 14/213,955, filed on Mar. 14, 2014, now Pat. No. 9,505,265.

(Continued)

(51) Int. Cl.
| | |
|---|---|
| *G09G 3/30* | (2006.01) |
| *B60B 1/00* | (2006.01) |
| *B60Q 1/32* | (2006.01) |
| *B60B 7/00* | (2006.01) |
| *H02K 1/17* | (2006.01) |

(Continued)

(52) U.S. Cl.
CPC ............... *B60Q 1/326* (2013.01); *B60B 1/00* (2013.01); *B60B 7/00* (2013.01); *B60B 7/006* (2013.01); *B60B 7/0033* (2013.01); *B60B 7/0053* (2013.01); *B60K 35/00* (2013.01); *B60L 7/10* (2013.01); *B60L 7/12* (2013.01); *B60R 16/033* (2013.01); *B60R 16/0307* (2013.01); *B60R 25/104* (2013.01); *G09G 3/30* (2013.01); *H02K 1/17* (2013.01); *H02K 1/22* (2013.01); *H02K 5/00* (2013.01); *H02K 7/1846* (2013.01); *B60B 7/20* (2013.01); *B60B 2360/102* (2013.01); *B60B 2900/572* (2013.01);

(Continued)

(58) Field of Classification Search
None
See application file for complete search history.

(56) References Cited

U.S. PATENT DOCUMENTS

| | | | | |
|---|---|---|---|---|
| 2010/0187955 A1* | 7/2010 | Steers | ............... | H02K 7/14 310/67 R |
| 2013/0187492 A1* | 7/2013 | Woolmer | ............... | H02K 21/24 310/54 |
| 2013/0187921 A1* | 7/2013 | Gilbert | ............... | B60K 35/00 345/426 |

* cited by examiner

*Primary Examiner* — Muhammad N Edun
(74) *Attorney, Agent, or Firm* — Franklin & Associates International Inc.; Matthew F. Lambrinos (57) ABSTRACT

A power generation system is provided configured for installation within a wheel of a vehicle. The system includes a stator having a plurality of face-mounted permanent magnets; and a rotor having a plurality of windings configured to rotate, with rotation of the wheel, in proximity to the permanent magnets thereby generating a current. The stator is mounted to a brake caliper of the vehicle. Also provided is a wheel-based vehicle display system including a light emitting diode (LED) array arranged on or within a wheel of a vehicle; a power source connected thereto; and a controller connected to the LED array. The display system is configured to display at least one of: textual information, visual images or full-motion video.

20 Claims, 5 Drawing Sheets

Related U.S. Application Data (60) Provisional application No. 61/852,288, filed on Mar. 15, 2013.

(51) Int. Cl.
*B60R 16/033* (2006.01)
*H02K 5/00* (2006.01)
*B60L 7/10* (2006.01)
*H02K 7/18* (2006.01)
*B60K 35/00* (2006.01)
*B60L 7/12* (2006.01)
*B60R 16/03* (2006.01)
*B60R 25/104* (2013.01)
*H02K 1/22* (2006.01)
*B60B 7/20* (2006.01)

(52) U.S. Cl.
CPC .... *B60K 2350/924* (2013.01); *G09G 2320/10* (2013.01); *G09G 2380/10* (2013.01)

VEHICLE WHEEL-BASED POWER GENERATION AND DISPLAY SYSTEMS

RELATED APPLICATIONS

This application is a continuation of U.S. Non-Provisional application Ser. No. 14/213,955, filed Mar. 14, 2014, which claims the benefit of priority under 35 U.S.C. §119(e) from U.S. Provisional Patent Application 61/852,288, entitled "Vehicular Inter-Wheel Electromagnetic Power Generation System", which was filed Mar. 15, 2013, the entire contents of which are incorporated herein by reference as if fully set forth.

FIELD OF THE INVENTION

The present application relates generally to vehicle wheel-based power generation and display systems. In particular, the present invention relates to an auxiliary electrical power source from an inter-wheel generator and the display of information, visual images and full motion video sequences on the rotating wheels of a vehicle.

BACKGROUND

There are various known means to generate electromagnetic power. For example, most generators are built with a radial flux configuration. This means that the air gap between the stator and the rotor is cylindrical. In permanent magnet generators, often the permanent magnets rotate and are located in the interior, while the coils are stationary and located on the exterior.

The chief advantage of this kind of generator is that because of its ubiquity, there are a large variety of off the shelf systems in many configurations. However, they tend to be longer than they are wide in diameter, and most are not very efficient below 1000 RPM. This makes them difficult to package in a wheel and use in a direct drive configuration at common driving speeds.

Further, there are several consumer products on the market such as flashlights that generate power via a linear motion, induced by acceleration or tilt. The wheel is constantly rotating through the gravitational field, so it is possible to use such a scheme to generate electrical power.

However, a large sports utility vehicle (SUV) wheel at 25 mph results in a centripetal acceleration of about 10 g at 130 mm (about 5 in) from the axis. This means that if a mass were allowed to move freely in the radial direction, the centripetal force would overwhelm the 1 G gravitational acceleration, resulting in the mass moving to the outermost position of the rim and staying there.

However, although the gravitational acceleration is overwhelmed by the centripetal acceleration, there is still a 10% variation in the inertial forces on a mass at this location, which could be used to generate power. One technique would be to attach the mass to a spring attached in the radial direction, and use the resulting motion to drive an electric machine. However, it would be difficult to get a very large motion, making it very difficult to harness significant electrical power this way.

In the past two decades, reasonably priced high remanence magnetic materials such as Neodymium-Iron-Boron (Nd—Fe—B) have become available, enabling new electric machine configurations. One of these is the axial flux permanent magnet machine, which has an air gap shaped like a circular face. These machines have seen many applications as generators, especially in small-scale wind power.

Several rear projection technologies are commercially available. Each of the three primary technologies—Liquid Crystal Display (LCD), Digital Light Processing (DLP), and Liquid Crystal on Silicon (LCOS) depend on a very bright white light source and blocking spatial and color components of the light beam to produce an image. Even though the light source may be very efficient, overall efficiency is reduced because light is blocked/absorbed to create the image.

A Liquid Crystal Display (LCD) creates an image by aligning liquid crystal molecules to block or transmit light. LCD displays may be back lit-having a light source located behind the display, reflective—using impending light, or transflective—combining the two strategies. It is difficult to achieve both power efficient daylight readability and nighttime readability in the same display. However, nearly all LCDs are manufactured to have a rectangular form factor, which can be difficult to apply to a circular wheel face.

Bistable displays have pixels whose states are electrically set, but which maintain the set state without the application of power. These displays use little power, but cannot display video, and are not visible without external lighting.

Therefore, there is a need to develop an auxiliary electrical power source from an inter-wheel generator and a visual display of information, visual images and full motion video sequences on the rotating wheels of a vehicle.

SUMMARY

According to a first aspect of the invention, there is provided a power generation system configured for installation within a wheel of a vehicle. The system includes a stator having a plurality of face-mounted permanent magnets; and a rotor having a plurality of windings configured to rotate, with rotation of the wheel, in proximity to the permanent magnets thereby generating a current. The stator is mounted to a brake caliper of the vehicle.

According to another aspect, there is provided a wheel-based vehicle display system including a light emitting diode (LED) array arranged on or within a wheel of a vehicle; a power source connected thereto; and a controller connected to the LED array. The display system is configured to display at least one of: textual information, visual images or full-motion video.

According to a yet further aspect, there is provided a power generation system configured for installation within a wheel of a vehicle, the system including a stator, mounted to a brake caliper of the vehicle, the stator having a plurality of face-mounted permanent magnets; and a rotor having a plurality of windings configured to rotate, with rotation of the wheel, in proximity to the permanent magnets thereby generating a current, which is connected to a wheel-based vehicle display system, which includes a light emitting diode (LED) array arranged on or within the vehicle wheel; and a controller connected to the LED array, the display system is configured to display at least one of: textual information, visual images or full-motion video.

BRIEF DESCRIPTION OF THE DRAWINGS

The following detailed description of the preferred embodiment of the present invention will be better understood when read in conjunction with the appended drawings. For the purpose of illustrating the invention, there are shown in the drawings embodiments, which are presently preferred.

It is understood, however, that the invention is not limited to the precise arrangements and instrumentalities shown. In the drawings.

DETAILED DESCRIPTION OF THE PREFERRED EMBODIMENTS

Introduction to the Embodiments

Certain terminology is used in the following description for convenience only and is not limiting. The words "right," "left," "top," and "bottom" designate directions in the drawings to which reference is made. The words "a" and "one," as used in the claims and in the corresponding portions of the specification, are defined as including one or more of the referenced item unless specifically stated otherwise. This terminology includes the words above specifically mentioned, derivatives thereof, and words of similar import. The phrase "at least one" followed by a list of two or more items, such as "A, B, or C," means any individual one of A, B or C as well as any combination thereof.

The power generation system as shown and described herein provides a safe and sustainable means of generating, storing and dispensing electric power entirely independently of the primary vehicular battery. This independent and sustainable power source can then be used for additional electrical applications while the vehicle is in motion without draining the vehicle's battery. Such uses have potentially endless applications, and include but are not limited to: a vehicular wheel based communications, rotational and non-rotational billboard image display, broadcast video display system, silent video alarm and automotive security system, vehicular wheel broadcasting, entertainment, and inter-vehicle communications network.

A force based power generation design can be contemplated. Approximately one quarter of the vehicle weight is supported by each wheel. In the case of a large sports utility vehicle (SUV) (e.g. GMC Yukon®, Cadillac Escalade®) with a curb weight of over 5,367 lbs, that means that an average of 1,342 lbs is on each wheel. This force is applied from the hub of the wheel through its structure and the tire to the ground.

As an example, the wheel rotates 8.72 times per second at 25 mph on an Escalade, meaning that 11.47 Joules must be generated in each flip to produce 100 W. This means that a 1342 lb (5879N) load would have to be lifted 1.92 mm/rotation. Some materials, such as piezo ceramics and electro-active polymers, are effective for small displacement, high force power generation. However, this deflection would probably require a very tall and expensive piezo stack.

Tire deflection is also contemplated as a power generation design, where the outer wall of the tire moves several mm with each rotation. It should be possible to harness this motion to generate power. This could be accomplished electromechanically by placing some mechanism in the pressurized chamber. Another method would be to create a series of sealed pressure chambers inside the tire, and allow air to flow between them using some kind of turbine.

Thermal power generation is also considered since both the tire and the brakes generate a fair amount of heat that is dissipated into the environment. Because of this, there is a temperature differential, which may be harnessed to generate electricity. One means of doing this is to use a thermoelectric material to generate power directly. Another means is to employ a heat engine to create mechanical power that may drive an electrical machine.

The power generation system generates electricity for storage and use during and as a result of the rotation of the vehicles wheels when the vehicle is in motion during the normal driving and vehicular use.

The power generation system can be custom built into a range of sets of wheels designed for use on most foreign and domestic four wheel and two wheel vehicles regardless of lug nut configuration including but not limited to cars, sport utility vehicles, trucks, buses and motorcycles.

Additional mass was a consideration, since adding too much mass to the wheel will interfere with the proper functioning of the suspension. Essentially, a large mass, because of its inertia, can overwhelm the suspension springs and cause the tires to no longer reliably contact the road over height variations such as potholes. Describing how much mass is too much is dependent on the individual vehicle suspension and requires in depth analysis. As an example, a benchmark was selected based on reports of a Chevrolet S-10® pickup with in-wheel electric motors as part of a hybrid electric retrofit. This installation was reported to add 33 lbs to each wheel, and was possible with modifications to the suspension system. Since it is undesirable to require suspension modifications as part of the LED Wheels installation, it is desirable to keep the net increase to the unsprung mass less than 33 lbs.

By providing a sustainable power source and a method of generating, storing and dispensing electric power entirely independently of the vehicular battery, the power generation system provides the vehicle owner with a means of installing and operating a variety of electrical devices, including but not limited to: a set of wheel based communications and broadcast video display systems with minimal alterations to the vehicle greatly reducing the manpower and expenses entailed in installing and operating a set of wheels containing the wheel based communications and broadcast video display system.

The wheel-based communications and broadcast video display system requires power connected to a display, which will be mounted on a moving wheel on a passenger car or other moving vehicle.

Light Emitting Diodes (LEDs) are semiconductor light sources that usually produce a single color of light. Composite LED components are available combining a red, green, and blue LED that together can produce an arbitrary color. An adequate number of LED's put together can produce an image. Relative to other means of display, LED's have relatively good luminous efficacy, in the range of 4-10 lm/W for practical color displays.

Specifically, RGB LEDs are advantageous because of their power efficiency, robustness, and flexibility to create difference geometries. Unlike technologies such as LCD, LEDs are typically purchased as individual components, each consisting of one pixel. This results in a fair amount of manufacturing overhead to build an array, but also means that there is more freedom to make the form factor and control match the application. A fair example of an RGB LED is the Seoul Semiconductor UBMGSRT8213, available in a 2.6 mm×3.2 mm package.

DETAILED DESCRIPTION

Figure 1A:
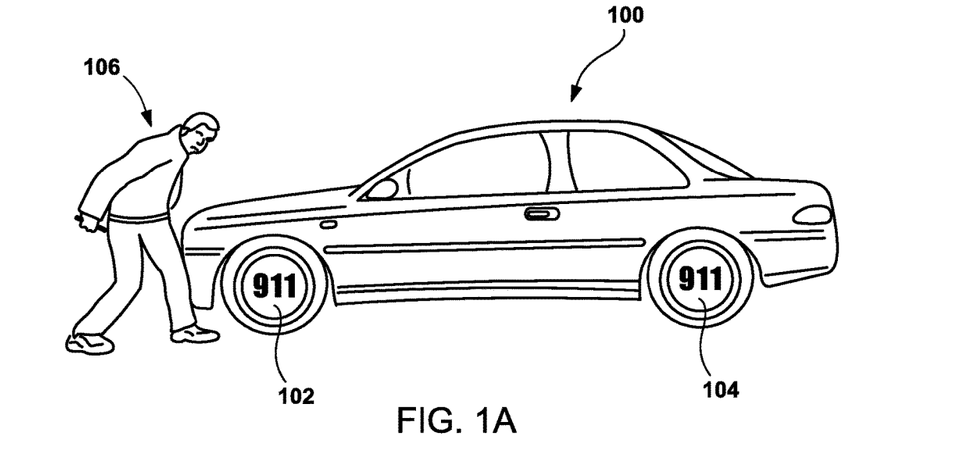
FIGS. 1A and 1B depict a wheel-based display system in accordance with the present invention in use on a vehicle.

In FIG. 1A, a vehicle 100 with the wheel-based communications and broadcast video display system installed is shown in an alarm or security mode. The front and rear wheel displays 102, 104 display warning indicia, which deter a would-be perpetrator 106. In this case, the image "911" is displayed thereby indicating an emergency situation in which assistance is required.

Figure 1B:
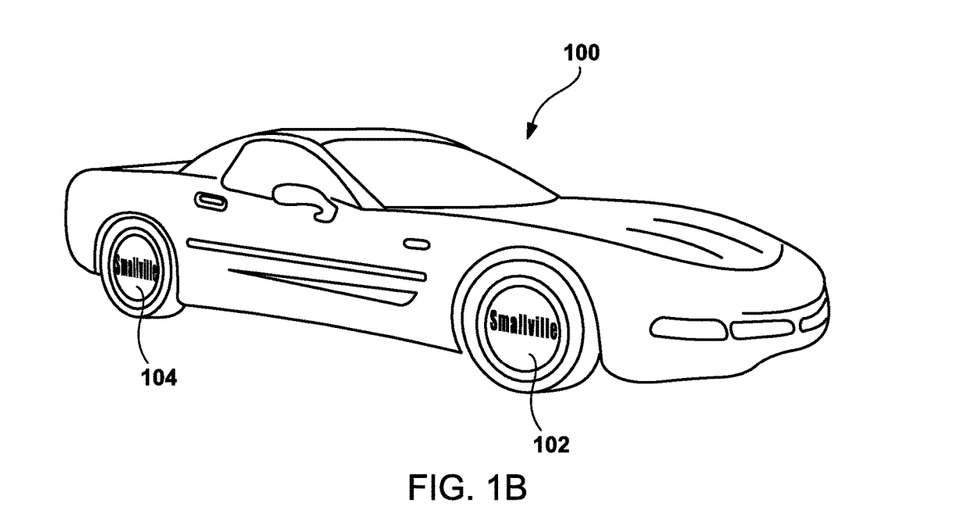

FIG. 1B depicts a vehicle with the wheel-based communications and broadcast video display system installed, which is shown in a billboard mode. The front and rear wheel displays 102, 104 display, in this case, promotional material/information. It should be noted that the display can be daylight or nighttime readable, provides a quality image, and can operate continuously under normal vehicular driving, stationary and parked conditions.

Daylight readability greatly increases the amount of time during which the wheels can be delivering content. For the outdoor signage industry, a brightness of at least 5000 Nits (cd/m2) is recommended. Given a 90-degree viewing angle, this yields 9200 lm/m2. For a 16" display, this means about 1200 lm. 5000 Nits is a figure for signs to be visible from billboard distances; given that wheels will primarily be observed at closer range, a smaller figure will likely suffice.

Figure 2:
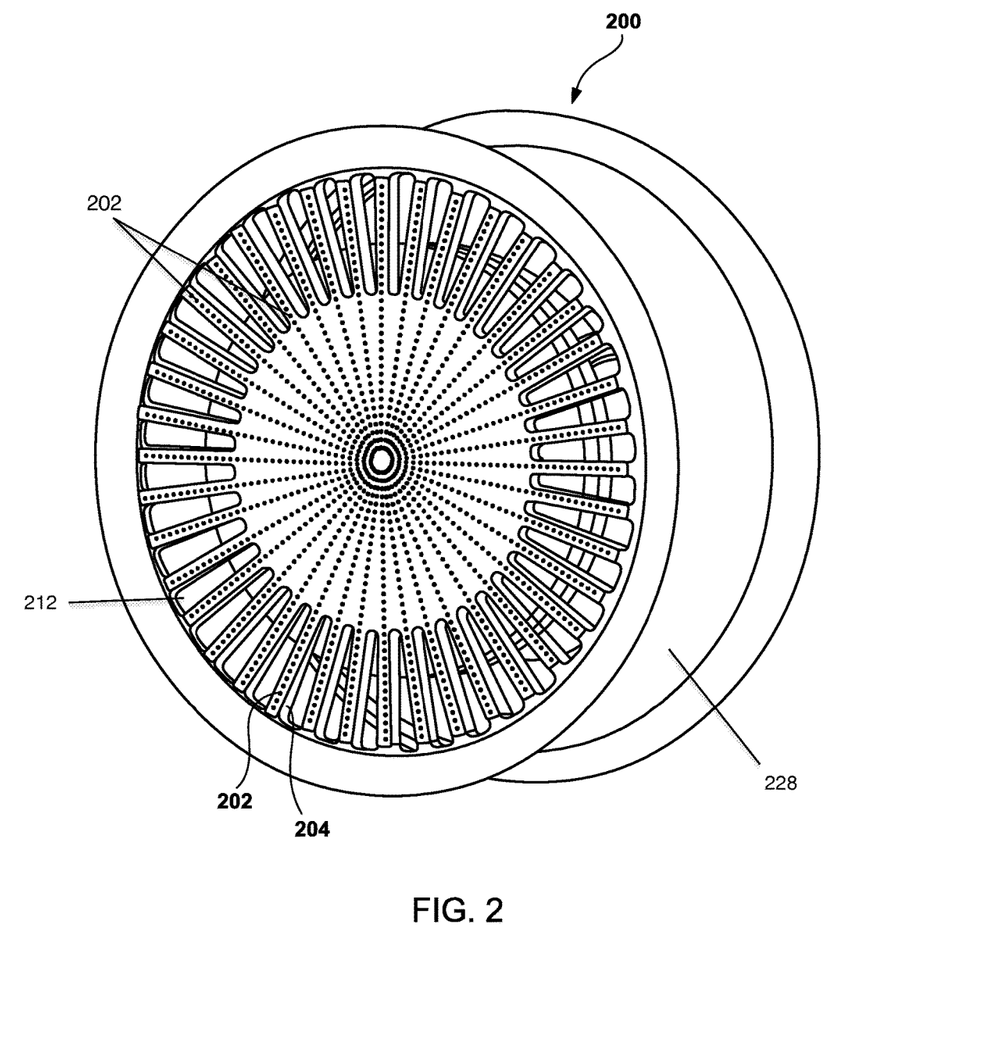
FIG. 2 depicts a first embodiment of the wheel-based display system in accordance with the present invention.

As shown in the embodiment of FIG. 2, the wheel 200 includes a plurality of spokes 204, which emanate radially from a central portion of the wheel 200. Interposed between the spokes 204 are slots or vents 212, which permit the dissipation of heat therethrough. The brakes generate a great deal of heat, and a generator and display can generate a significant amount of additional heat. The vents 212 therefore provide for adequate cooling, primarily through airflow, so that no component exceeds its design temperature.

In the embodiment of FIG. 2, LEDs 202 are arranged on the wheel along the spokes from a central portion of the wheel 200 to create an array. To facilitate fabrication and control, a series of identical spokes 204 radiate from the center of the wheel. Each spoke comprises a Printed Circuit Board (PCB) with its own microcontroller. By making many of these identical boards for each wheel, good economies of scale may quickly be obtained.

Since, when the vehicle 100 is in motion, the display 102, 104 spins with the wheel 200, the design is greatly simplified. Spinning the display 102, 104 also allows for a better picture quality with fewer LEDs 202 thanks to a Persistence of Vision (POV) effect. In order to control such a spinning display, it is necessary to determine the precise angular orientation of the wheel at all times. Fortunately, the power generation system described below results in a regular periodic electrical waveform. With a single precise Hall effect sensor/magnet pair to define a home position, this periodic signal provides precise angular orientation.

The LED arrangement in FIG. 2 is represented by 40 spokes 204 having approximately 32 LEDs 202 each. The spokes 204 are shown as having wider spacing between LEDs near the center so that the pixel density is relatively consistent. While the wheel 200 is moving, the image quality will increase as the POV effect allows the interpolation of the spaces between the spokes 204. At maximum brightness, these LEDs consume approximately 190 mW each, yielding a luminous efficacy of 6.8 lm/W.

The resolution of the static image could be increased by adding more spokes of less than the full radial length near the rim. This would fill in the largest spaces between pixels.

Figure 4:
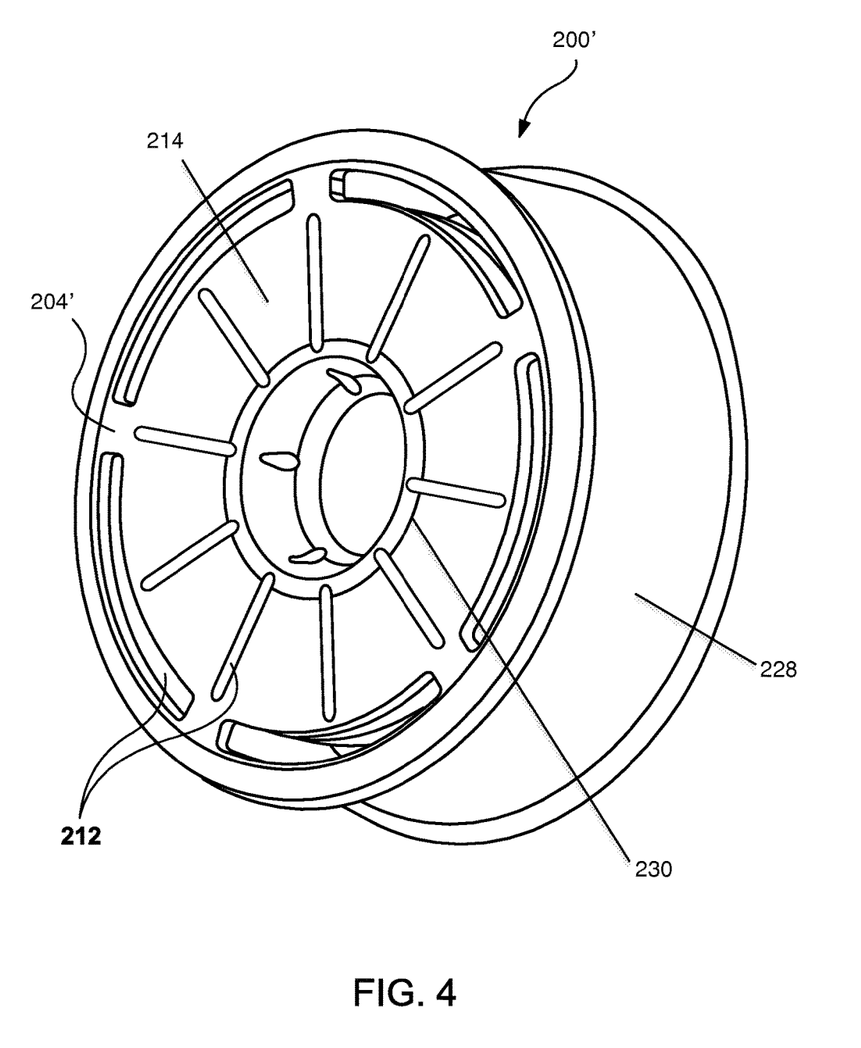
FIG. 4 is a second embodiment of the wheel-based display system in accordance with the present invention.

In the embodiment shown in FIG. 4, the wheel 200' has an array 214 of LEDs, which are arranged on an outward facing portion 230 of the wheel 200'. In this embodiment, the wheel 200' does not include 40 radially extending spokes as in FIG. 2, rather only 5 spokes 204', which connect the outward facing portion 230 of the wheel 200' including the LED array 214 to the outer circumference of the rim 228.

As in the embodiment shown in FIG. 2, the wheel 200' of FIG. 4 likewise includes slots or vents 212 to dissipate heat generated by motion and braking of the wheel.

It is noted that in order to provide adequate luminous intensity at the wheel 200, 200', it is possible to create a backlit display 102, 104 using LCD or other technology in which the light source is located on the non-rotating part of the vehicle 100 and the display it illuminates is located on the rotating portion.

Figure 3:
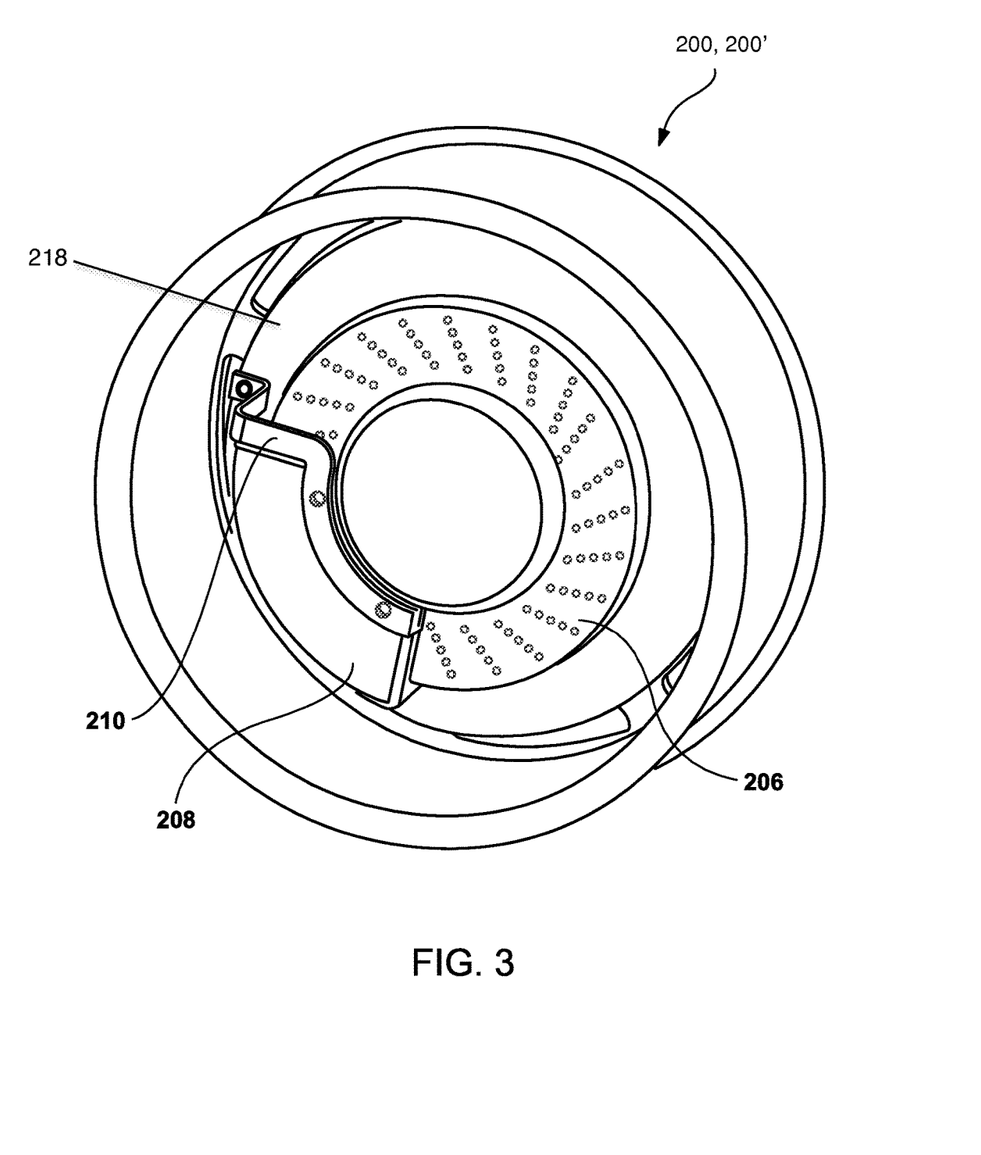
FIG. 3 is a schematic depiction of an electromagnetic power generation system in accordance with the present invention.
Figure 5:
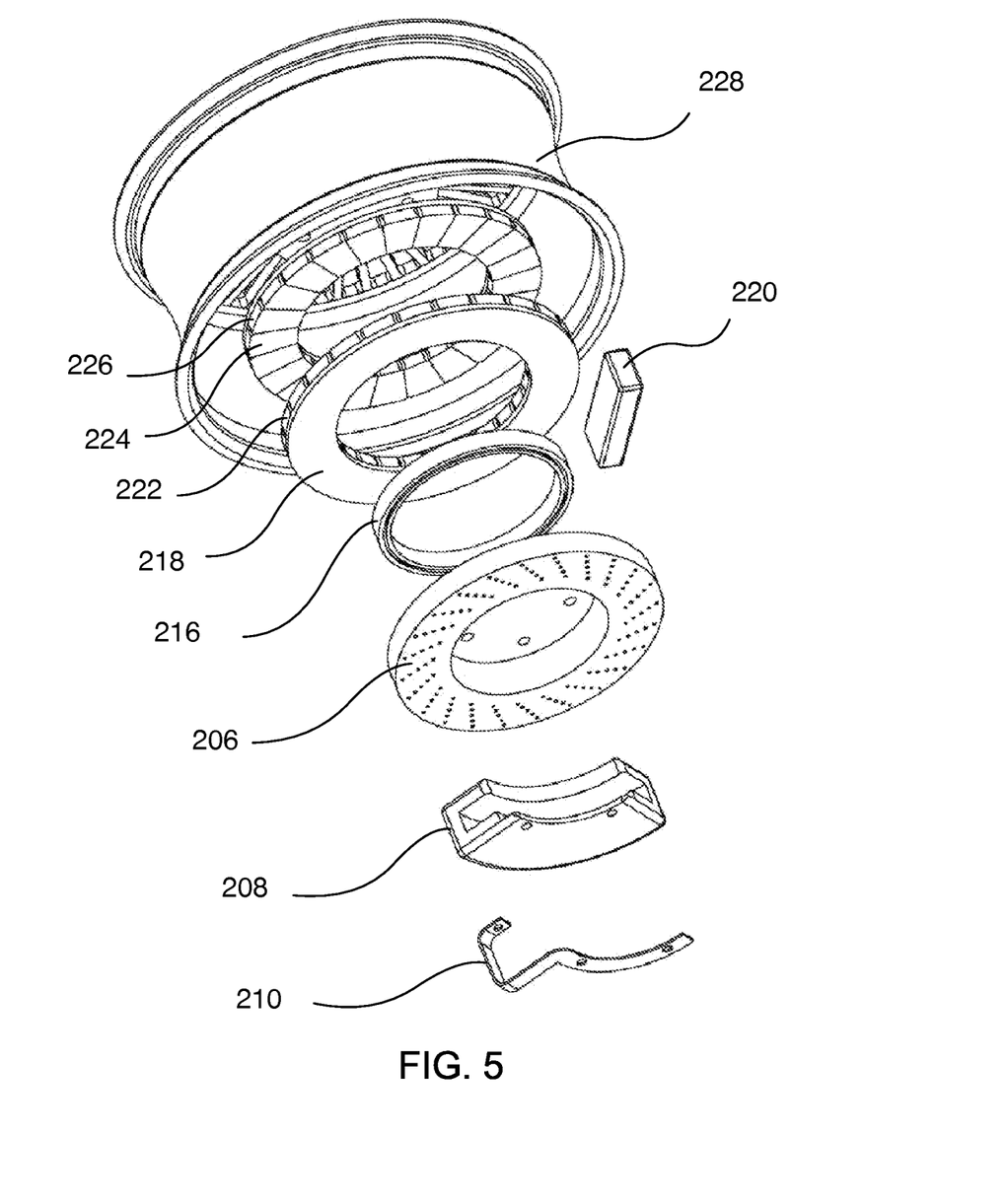
FIG. 5 is an exploded view of the electromagnetic power generation system in accordance with the present invention.

Turning now to FIGS. 3 and 5, a wheel-based power generation system is shown. An axial flux permanent magnet generator is used to take advantage of the geometry of the wheel and the low rotational speed. In order to keep the generator mechanically simple, a single rotor 224, 226, single stator 218, 222 design is provided. The stator includes face-mounted permanent magnets 222 mounted to a magnet-mounting disc 218, and the rotor includes sunflower configured copper windings 226 mounted to a windings mounting disc 224.

FIG. 3 shows an interior view of wheel 200, 200' where a magnet mounting disc 218 is secured to a brake caliper 208 of the vehicle via a mounting bracket 210. The magnet-mounting disc 218 carries permanent magnets 222 and surrounds brake disc 206.

Wedge shaped magnets 222 can be used in order to maximize usage of the stator face. Twenty-four (24) of these magnets form a 12-inch diameter disc shape with an 8-inch diameter hole. The magnets 222 are much more effective with a steel core 218 backing them to form a complete magnetic circuit. Because this core moves with the magnets, the magnetic field will not vary greatly inside it and there is little propensity for parasitic losses. Therefore, a piece of ordinary plate steel, e.g. cut with a water jet, is an effective solution.

In order to provide 300 Watts of mechanical power at 262 RPM, 11 N-m of torque must be applied. In order to provide torque to the wheel-based power generation system, the mounting bracket 210 is connected to the bolts that secure the brake caliper 208. These bolts vary somewhat in size and position, however, since the forces on the mounting bracket 210 will not be too great, a simple stamped sheet metal part may be used to transmit the forces. Most brake calipers 208 are attached via two bolts applied from the direction facing the center of the vehicle 100. Although the bolt pattern for the brake calipers vary somewhat, it could be fairly economical to produce and stock a variety of the brackets 210 for different vehicles and the final installer may modify the part or easily fabricate an original one for unusual applications.

FIG. 5 is an exploded view of the wheel-based power generation system. A mounting bracket 210 attached to a brake caliper 208 of the vehicle 100, within which brake disc 206 rotates. A plurality of permanent magnets 222 are mounted to a magnet mounting disc 218 or steel core, defining a stator, which is mounted on the mounting bracket 210, thereby preventing the magnets from rotating. In order to use a simple lightweight bracket 210 to carry the generator torque, it is necessary to constrain the stator against the wheel 200, 200' so that it is constrained in other directions. The stator is constrained by a bearing 216 having at least a 7-inch inner diameter to fit outside a lug circle of the vehicle's wheel hub.

In order to simplify the construction of an initial prototype, a single-phase rotor 224, 226 was designed. With one coil per pole wired in series, and 24 windings per coil, this armature should provide about 40 Volts even at speeds as low as 25 mph.

As with the magnets 222, the generator performance will be greatly enhanced with a steel backing for the windings 226. However, because the magnetic field is time varying for this component, parasitic losses are of significant concern. Therefore, a solution is to use a wound ribbon of high silicon magnet steel to create a laminated core. Alternatively, sintered magnet steel may be an appropriate material for a mass produced rotor core.

The rotor 224, 226 is mounted in the wheel 20, 200' and rotates with the wheel 200, 200' in proximity to the permanent magnet stator 218, 222 thereby generating a current. The current generated can be stored in a battery 220 or can be directed to power the above described wheel-based communications and broadcast video display system or other device of the vehicle.

In order to switch the LEDs of the wheel-based communications and broadcast video display system, a reliable high current rail at 5-10 VDC is necessary. The wheel-based power generation system will typically produce power at 40-100 VDC rectified. Therefore, some power control electronics are necessary. DC-DC conversion circuitry has made great advances in the last several years, so it is likely that some kind of "buck" conversion circuit can be coupled with an intelligent model of generator performance to balance power between the display 102, 104 and battery 220.

Electronics are necessary on the wheel 200, 200' for power control, communications, and driving the display 102, 104. Since none of these systems need be especially bulky, there are two main volumes available for this purpose. The first being the space in front of the lugs, which mount the wheel 200, 200' to the hub of the vehicle 100. The second being the annulus between the generator and the rim 228. It may also be appropriate to locate communications and display drivers in the lug space, and power control along with the battery 220 in the annulus.

Alternatively/additionally, electrical power may also be transmitted from the vehicle electrical system to the wheel via a coupling. This coupling may take the form of copper moving against carbon brushes, or copper slip rings. Several geometric configurations are possible.

Alternatively/additionally, electrical power may also be transmitted from the vehicle electrical system to the wheel via an electrical transformer in which the primary coil is located on the non-rotating part of the chassis and the secondary is located on the wheel. Such an electrical device may be configured to perform independent of the rotation, or it may be possible to harness a small amount of power from the rotation.

It is understood, therefore, that this invention is not limited to the particular embodiments disclosed, but is intended to cover all modifications which are within the spirit and scope of the invention as defined by the appended claims; the above description; and/or shown in the attached drawings.

What is claimed is:

1. A power generation system configured for installation within a wheel of a vehicle, the system comprising a stator, mounted to a brake caliper of the vehicle, the stator comprising a plurality of face-mounted permanent magnets; and a rotor having a plurality of windings configured to rotate, with rotation of the wheel, in proximity to the permanent magnets thereby generating a current, which is connected to a wheel-based automobile display system, wherein said wheel-based automobile display system comprises a broadcast video display system.

2. The power generation system of claim 1, wherein the stator is mounted to a bracket, which is mounted to the brake caliper of the vehicle.

3. The power generation system of claim 2, wherein the magnets of the stator are mounted to a disc, which is mounted to the bracket.

4. The power generation system of claim 3, wherein the magnets are wedge-shaped.

5. The power generation system of claim 1, wherein the rotor is comprised of copper windings in a sunflower configuration.

6. The power generation system of claim 1, wherein the rotor is a single-phase rotor and comprises a steel backing for the coils.

7. The power generation system of claim 1, wherein the backing is mounted to the vehicle wheel.

8. The power generation system of claim 1, wherein the display system is configured as a security system, displaying alerts if the vehicle is stolen or if assistance is needed.

9. A wheel-based automobile display system comprising a display system; a power source connected thereto; and a controller connected to displays system, wherein the display system comprises a back lit display, said back lit display comprising a display and a light source for illuminating the display, wherein said light source is located on a non-rotating part of a vehicle and said display is located on a rotating portion on or within a wheel of the vehicle.

10. The display system of claim 9, further comprising a power controller; a communications interface and a display driver located within an annulus of the rim of the vehicle wheel.

11. The display system of claim 9, wherein said display is configured to display at least one of textual information, visual images or full-motion video with a Persistence of Vision (POV) effect while the vehicle wheel is rotating.

12. The display system of claim 9, wherein the display system is configured as a security system, which displays alerts if the vehicle is stolen or if assistance is needed.

13. The display system of claim 9, wherein the system displays promotional information.

14. A power generation and display system configured for installation within a wheel of a vehicle, the system comprising:
  a wheel-based power generator, wherein said wheel-based power generator comprises
  a stator, mounted to a brake caliper of the vehicle, the stator comprising a plurality of face mounted permanent magnets; and a rotor having a plurality of windings configured to rotate, with rotation of the wheel, in proximity to the permanent magnets thereby generating a current,
  a wheel-based automobile display system operably connected to said power generator, and
  a wheel-based battery, wherein the current generated is stored in said battery.

15. The system of claim 14, further comprising a power controller; a communications interface and a display driver located within an annulus of the rim of the vehicle wheel.

16. The system of claim 14, wherein said battery is located within an annulus of the rim of the vehicle wheel.

17. The system of claim 14, further comprising conversion circuitry for balancing power between the display and battery.

18. The display system of claim 14, wherein said display system is a Persistence of Vision (POV) display and wherein said Persistence of Vision (POV) display is at least one of: a textual information display, a visual images display and a full-motion video display.

19. The display system of claim 14, wherein the display system is configured as a security system, displaying which displays alerts if the vehicle is stolen or if assistance is needed.

20. The display system of claim 14, wherein the display system is a broadcast video display system.

* * * * *